US012502795B2

(12) United States Patent
Lin

(10) Patent No.: US 12,502,795 B2
(45) Date of Patent: Dec. 23, 2025

(54) PROTECTION LOCK STRUCTURE FOR PUSH-BUTTON CUTTER AND PUSH-BUTTON CUTTER

(71) Applicant: POWER STATE ENTERPRISES CO., LTD, Yangjiang (CN)

(72) Inventor: Xueliang Lin, Yangjiang (CN)

(73) Assignee: POWER STATE ENTERPRISES CO., LTD, Yangjiang (CN)

( * ) Notice: Subject to any disclaimer, the term of this patent is extended or adjusted under 35 U.S.C. 154(b) by 157 days.

(21) Appl. No.: 18/508,531

(22) Filed: Nov. 14, 2023

(65) Prior Publication Data

US 2025/0153374 A1 May 15, 2025

(51) Int. Cl.
*B26B 5/00* (2006.01)

(52) U.S. Cl.
CPC .................................... *B26B 5/003* (2013.01)

(58) Field of Classification Search
None
See application file for complete search history.

(56) References Cited

U.S. PATENT DOCUMENTS

2024/0391118 A1* 11/2024 Huang ...................... B26B 1/10
2025/0153374 A1* 5/2025 Lin ......................... B26B 5/003

FOREIGN PATENT DOCUMENTS

CN 112936351 A * 6/2021 ............... B26B 1/08
DE 202023104374 U1 * 9/2023 ............... B26B 1/08
TW 1823759 B * 11/2023

OTHER PUBLICATIONS

English translation of DE-202023104374-U1, dated Sep. 19, 2023.*
English translation of CN-112936351-A, dated Jun. 11, 2021.*
English translation of TW-1823759-B, dated Nov. 21, 2023.*

* cited by examiner

*Primary Examiner* — Hwei-Siu C Payer
(74) *Attorney, Agent, or Firm* — Westbridge IP LLC

(57) ABSTRACT

A protection lock structure for a push-button cutter includes a lock button and a limiting portion arranged on an adapter piece. The lock button is provided with a locking portion, the lock button is mounted on a housing and at least forms a first relative position and a second relative position with the housing. In the first relative position, the locking portion is abutted against the limiting portion, and in the second relative position, the locking portion is separated from the limiting portion.

9 Claims, 8 Drawing Sheets

PROTECTION LOCK STRUCTURE FOR PUSH-BUTTON CUTTER AND PUSH-BUTTON CUTTER

TECHNICAL FIELD

The application relates to the technical field of cutting tools, in particular to a protection lock structure for a push-button cutter and the push-button cutter.

BACKGROUND

A push-button cutter includes a housing, a push button, and a blade and the like. When it is used, the push button is pushed to push the blade out of the housing for use, and when it is not used, the push button is pushed reversely to hide the blade inside the housing. The existing push-button cutter does not have a protection lock structure, so that the blade may also be pushed out of the housing when a non-human active external force acts on the push button, there is a risk.

SUMMARY

A purpose of the application is to provide a protection lock structure for a push-button cutter and the push-button cutter, as to solve problems in existing technologies. A blade may only be pushed out of a housing in an unlocking state, and the risk of the blade being pushed out of the housing under a non-human active external force may be avoided. The protection lock structure has the advantages of simple structure, reliable function, and convenient operation.

Technical schemes adopted by the application are as follows.

In a first aspect, the application provides a protection lock structure for a push-button cutter, the push-button cutter includes a housing, a push button, a blade, and an adapter piece, the blade is arranged inside the housing, the adapter piece is connected to one side of the blade and is located inside the housing, one side of the push button is connected to the adapter piece, and the push button is at least partially exposed outside the housing; and the protection lock structure includes a lock button and a limiting portion arranged on the adapter piece, the lock button is provided with a locking portion, the lock button is mounted on the housing, the lock button at least forms a first relative position and a second relative position with the housing, in the first relative position, the locking portion is abutted against the limiting portion, and in the second relative position, the locking portion is separated from the limiting portion.

Further, a first operating end of the lock button penetrates an upper surface of the housing, a second operating end of the lock button penetrates a lower surface of the housing, the first operating end is pressed so that the lock button may be moved to the first relative position, and the second operating end is pressed so that the lock button may be moved to the second relative position.

Further, the locking portion is arranged in a middle position, located between the first operating end and the second operating end, of the lock button, and the locking portion is arranged to be protruded to one side of the adapter piece.

Further, the limiting portion is arranged at one end, near the lock button, of the adapter piece, and the limiting portion is bent and protruded upwards on an upper surface of the adapter piece.

Further, the protection lock structure further includes a positioning apparatus, and the positioning apparatus maintains the lock button in the first relative position and the second relative position.

Further, the positioning apparatus includes a positioning piece and mutually adapted positioning structures arranged respectively on the positioning piece and the lock button; and the positioning structure includes a positioning groove arranged on one side, towards the positioning piece, of the lock button, and a positioning protrusion arranged on one side, towards the lock button, of the positioning piece.

Further, the positioning groove is arranged as an arc-shaped groove, and the positioning protrusion is arranged as an arc-shaped protrusion corresponding to the arc-shaped groove.

Further, the housing includes an upper housing and a lower housing, opposite sides of the upper housing and the lower housing are closed mutually to form the housing, the opposite side of the upper housing or the lower housing is provided with a mounting groove, and the positioning piece is adaptively embedded in the mounting groove.

Further, the lock button includes an upper button portion and a lower button portion, and the upper button portion is detachably connected with the lower button portion.

Further, an upper end of the upper button portion is provided with an upper enlargement portion, a lower end of the lower button portion is provided with a lower enlargement portion, the upper surface, corresponding to the upper enlargement portion, on the housing is provided with an upper expansion hole adapted to the upper enlargement portion, the lower surface, corresponding to the lower enlargement portion, on the housing is provided with a lower expansion hole adapted to the lower enlargement portion, and the upper expansion hole and the lower expansion hole have a set depth; and the housing between the upper expansion hole and the lower expansion hole is provided with a mounting hole adapted to a middle section of the lock button, and the mounting hole communicates the upper expansion hole with the lower expansion hole.

In a second aspect, the application provides a push-button cutter, including a protection lock structure as described in the first aspect of the application.

The beneficial effects of the application are as follows.

Based on the protection lock structure for the push-button cutter and the push-button cutter of the application, its lock button is provided with the locking portion, the adapter piece is provided with the limiting portion, the lock button forms the first relative position and the second relative position with the housing, and in the first relative position, the locking portion is abutted against the limiting portion, this is a locking state, and the push button may not be pushed to push the blade out of the housing; and in the second relative position, the locking portion is separated from the limiting portion, this is an unlocking state, the push button may be pushed to push the blade out of the housing. The protection lock structure of the application only requires the addition of one lock button component to achieve the locking of the existing push-button cutter. Therefore, the structure is simple, and the protection lock structure blocks the limiting portion by the locking portion, as to block the movement journey of the adapter piece, there is no situation of blocking failure. Therefore, the locking function of the protection lock structure is reliable; and in use, the lock button may be simply pushed separately from the upper and lower sides to achieve unlocking and locking, and the operation is very convenient.

BRIEF DESCRIPTION OF THE DRAWINGS

Drawings are used to provide further understanding of the application and form a part of the description. It is used together with specific implementation modes below to explain the application, but should not constitute limitations on the application. In the drawings.

DETAILED DESCRIPTION OF THE EMBODIMENTS

Specific implementation modes of the application are described in detail below in combination with the drawings. It should be understood that the specific implementation modes described here are only intended to describe and explain the application and are not intended to limit the application.

Figure 1:
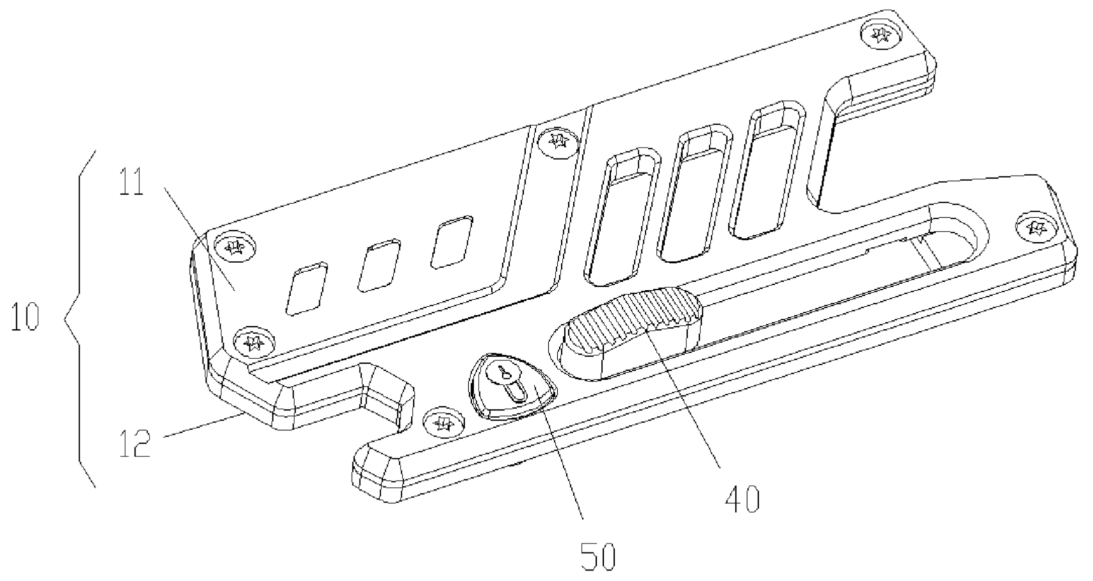
FIG. 1 is a stereogram of a protection lock structure for a push-button cutter described in the application.
Figure 2:
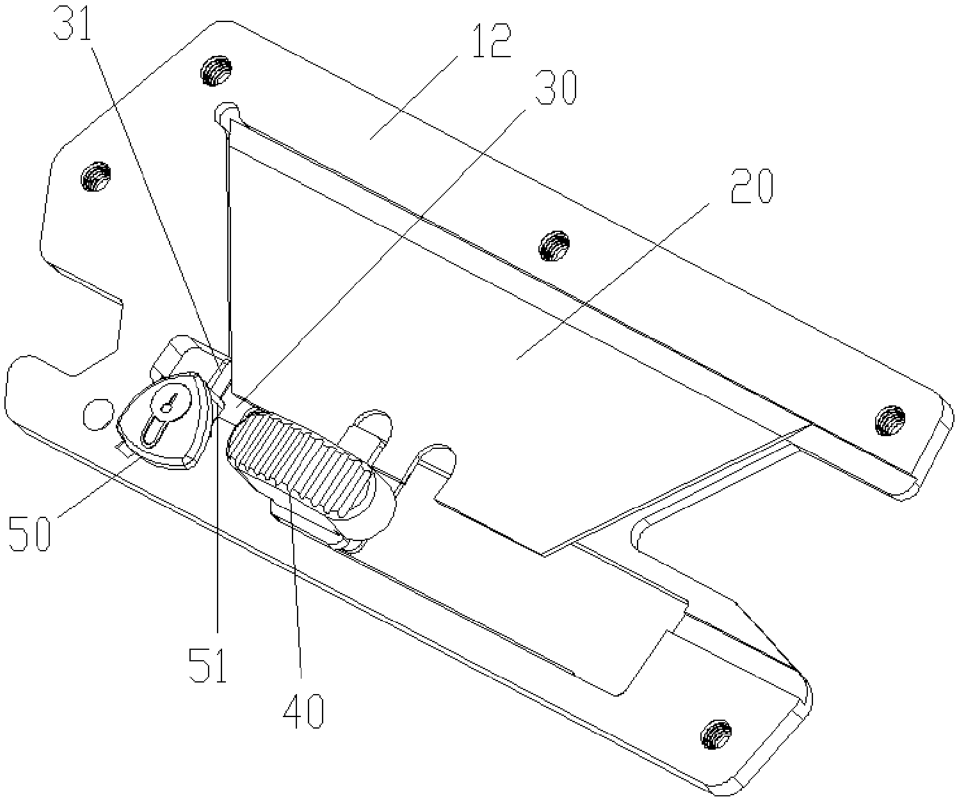
FIG. 2 is a stereogram of the protection lock structure for the push-button cutter described in the application when an upper housing is removed.
Figure 3:
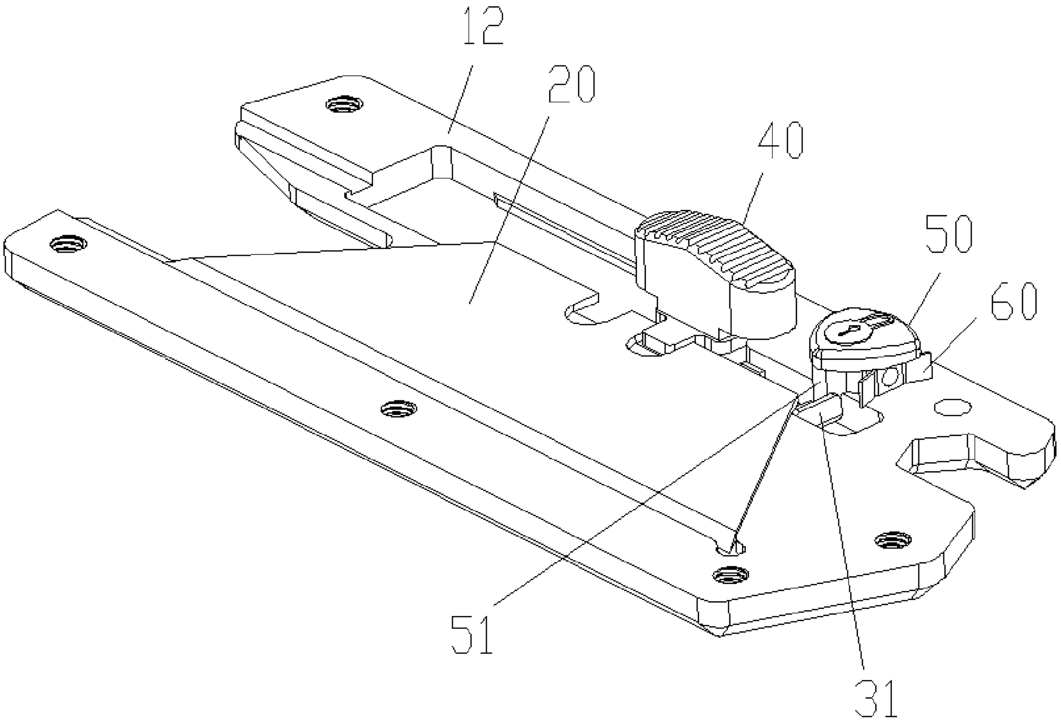
FIG. 3 is a stereogram of a lock button and a housing located in a first relative position according to the application.
Figure 4:
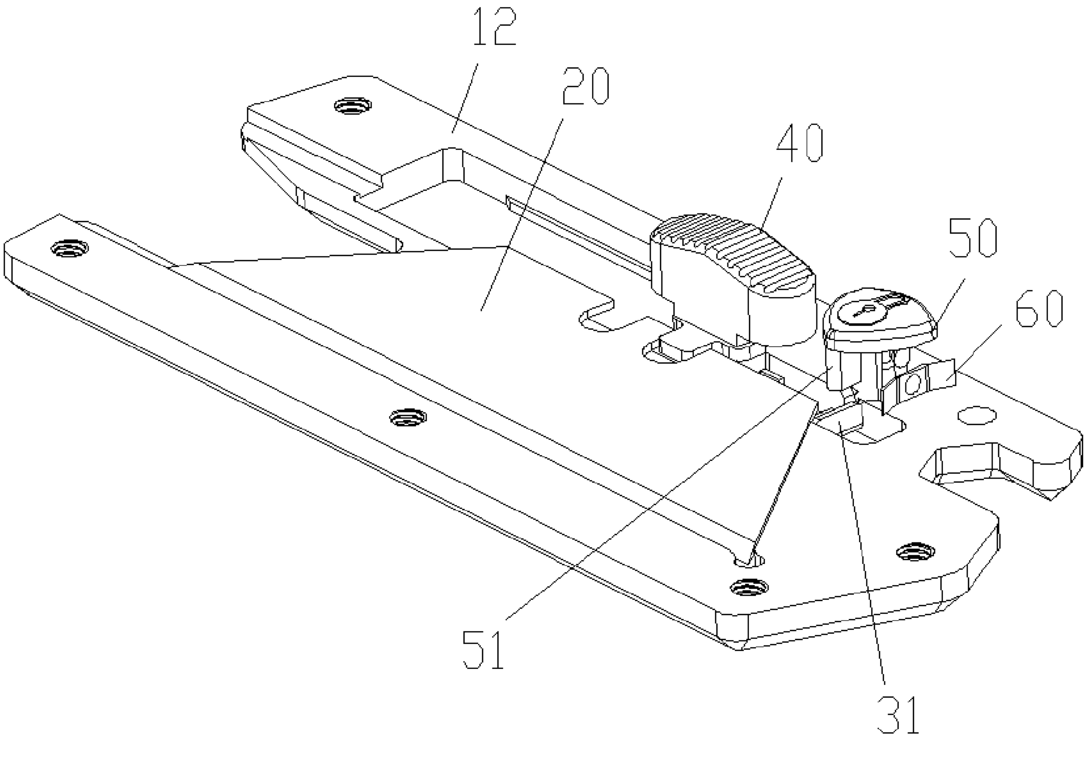
FIG. 4 is a stereogram of the lock button and the housing located in a second relative position according to the application.
Figure 5:
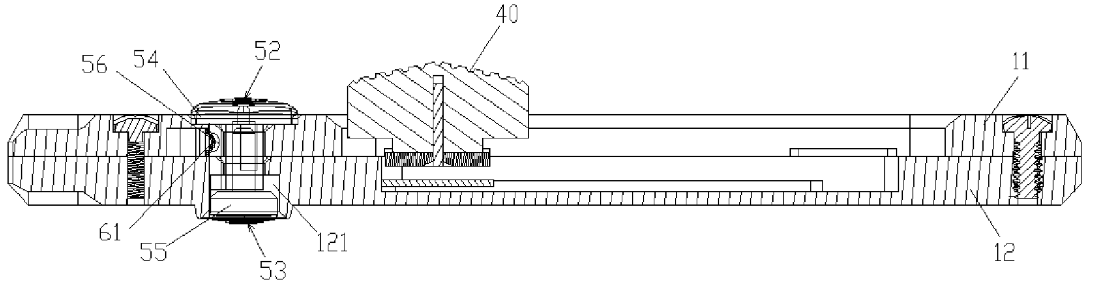
FIG. 5 is a section-view diagram of the lock button and the housing located in the first relative position according to the application.
Figure 6:
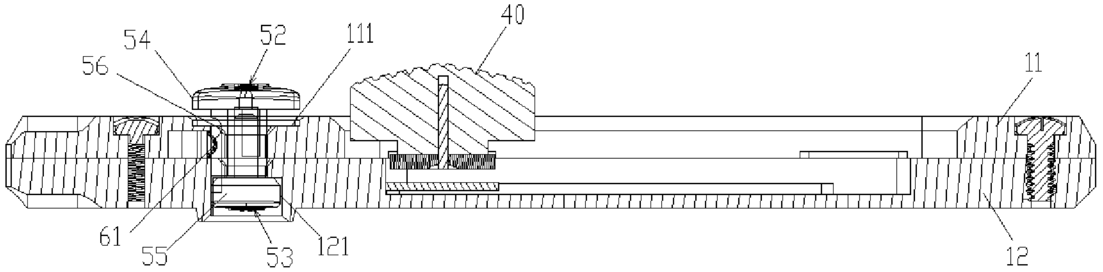
FIG. 6 is a section-view diagram of the lock button and the housing located in the second relative position according to the application.
Figure 7:
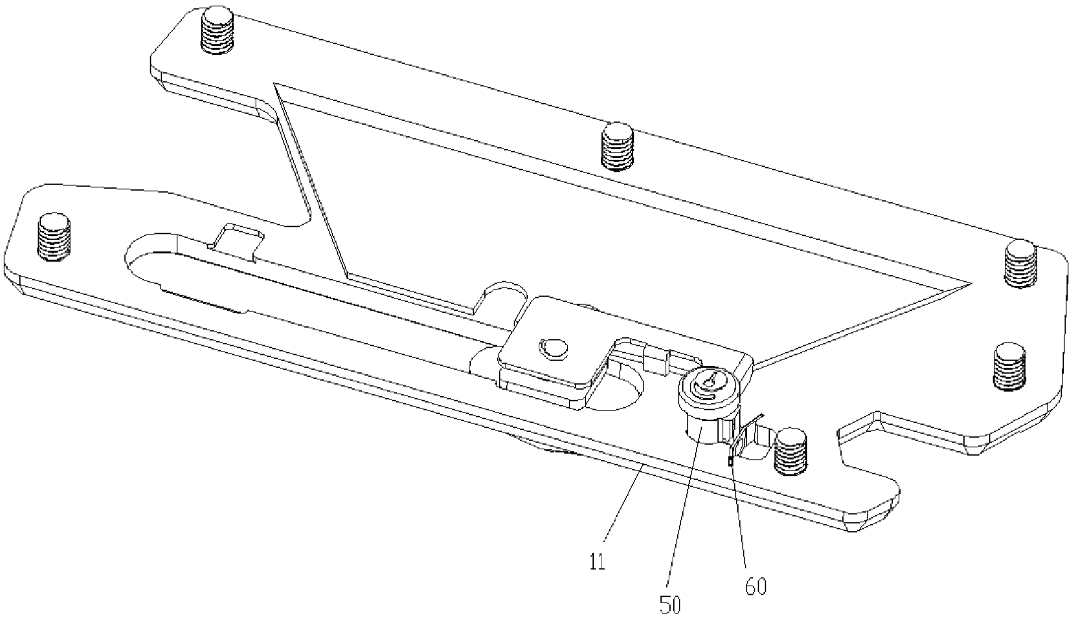
FIG. 7 is a stereogram of a positioning piece embedded in a mounting groove on the upper housing according to the application.
Figure 8:
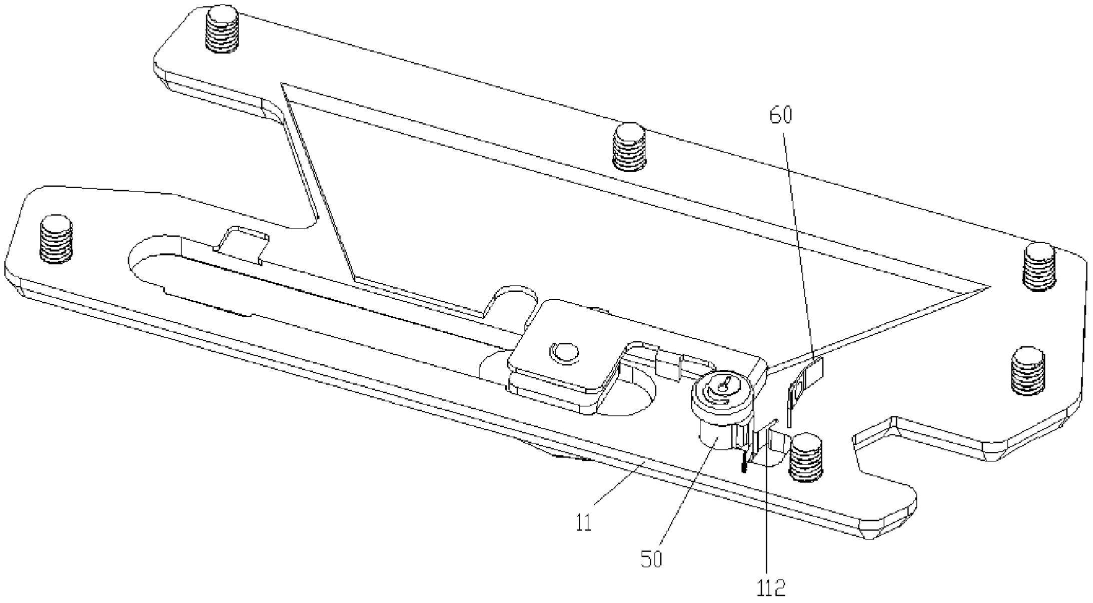
FIG. 8 is a stereogram of the positioning piece when being removed from the mounting groove on the upper housing according to the application.
Figure 12:
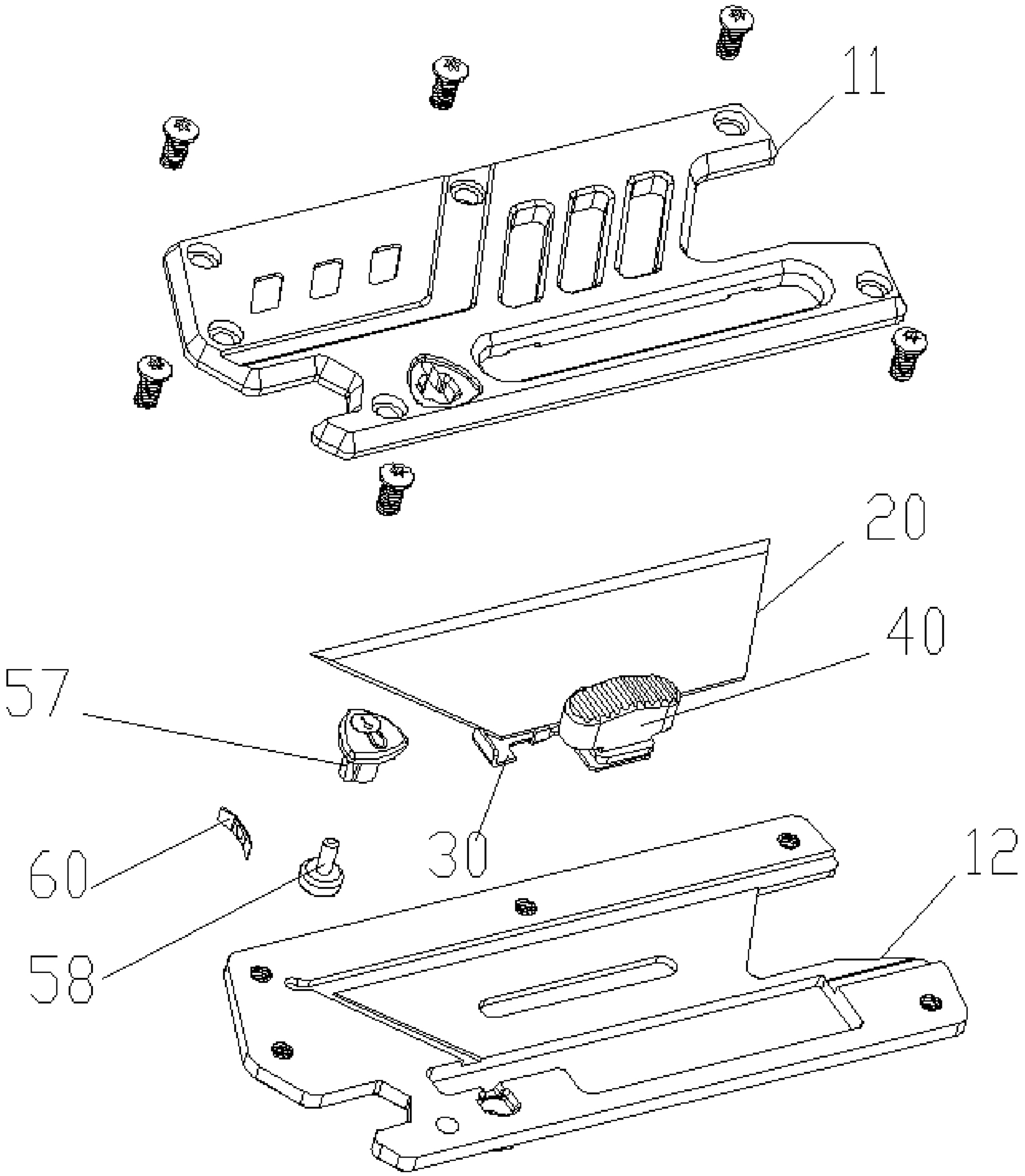
FIG. 12 is an exploded view of the protection lock structure for the push-button cutter according to the application.

Please refer to FIGS. 1-12, an embodiment of the application discloses a protection lock structure for a push-button cutter. As shown in FIGS. 1 and 12, the push-button 40 cutter includes a housing 10, a push button 40, a blade 20, and an adapter piece 30, the blade 20 is arranged inside the housing 10, the adapter piece 30 is connected to one side of the blade 20 and is located inside the housing 10, one side of the push button 40 is connected to the adapter piece 30, and the push button 40 is at least partially exposed outside the housing 10; as shown in FIGS. 2 to 4, the protection lock structure includes a lock button 50 and a limiting portion 31 arranged on the adapter piece 30, the lock button 50 is provided with a locking portion 51, the lock button 50 is mounted on the housing 10 and at least forms a first relative position and a second relative position with the housing 10, in the first relative position (as shown in FIGS. 3 and 5), the locking portion 51 is abutted against the limiting portion 31, and in the second relative position (as shown in FIGS. 4 and 6), the locking portion 51 is separated from the limiting portion 31. In the first relative position, the locking portion 51 is abutted against the limiting portion 31, this is a locking state, and the push button 40 may not be pushed to push the blade 20 out of the housing; and in the second relative position, the locking portion 51 is separated from the limiting portion 31, this is an unlocking state, the push button 40 may be pushed to push the blade 20 out of the housing.

Specifically, a first operating end 52 of the lock button 50 penetrates an upper surface of the housing 10, a second operating end 53 of the lock button 50 penetrates a lower surface of the housing 10, the first operating end 52 is pressed so that the lock button 50 may be moved to the first relative position, and the second operating end 53 is pressed so that the lock button 50 may be moved to the second relative position. In use, the first operating end 52 of the lock button 50 is pressed downwards, so that the lock button 50 may be moved from the second relative position to the first relative position, and the locking portion 51 is abutted against the limiting portion 31, as to achieve the locking state (it is in the locking state when it is not used and placed normally); and the second operating end 53 of the lock button 50 is pressed upwards, so that the lock button 50 may be moved from the first relative position to the second relative position, and the locking portion 51 is separated from the limiting portion 31, as to achieve the unlocking state (it is in the unlocking state when the blade 20 needs to be pushed out for use normally). Therefore, the lock button 50 is simply pushed separately from the upper and lower sides to achieve unlocking and locking, and the operation is very convenient.

The locking portion 51 is arranged in a middle position, located between the first operating end 52 and the second operating end 53, of the lock button 50, and the locking portion 51 is arranged to be protruded to one side of the adapter piece 30.

The limiting portion 31 is arranged at one end, near the lock button 50, of the adapter piece 30, and the limiting portion 31 is bent and protruded upwards on an upper surface of the adapter piece 30.

The protection lock structure further includes a positioning apparatus, and the positioning apparatus maintains the lock button 50 in the first relative position and the second relative position. Specifically, as shown in FIGS. 7, 8, 9, and 11, the positioning apparatus includes a positioning piece 60 and mutually adapted positioning structures arranged respectively on the positioning piece 60 and the lock button 50, the positioning structure includes a positioning groove 56 arranged on one side, towards the positioning piece 60, of the lock button 50, and a positioning protrusion 61 arranged on one side, towards the lock button 50, of the positioning piece 60. Further, the positioning groove 56 is arranged as an arc-shaped groove, and the positioning protrusion 61 is arranged as an arc-shaped protrusion corresponding to the arc-shaped groove.

The housing 10 includes an upper housing 11 and a lower housing 12, opposite sides of the upper housing 11 and the lower housing 12 are closed mutually to form the housing 10, the opposite side of the upper housing 11 or the lower housing 12 is provided with a mounting groove 112, and the positioning piece 60 is adaptively embedded in the mounting groove 112.

Figure 10:
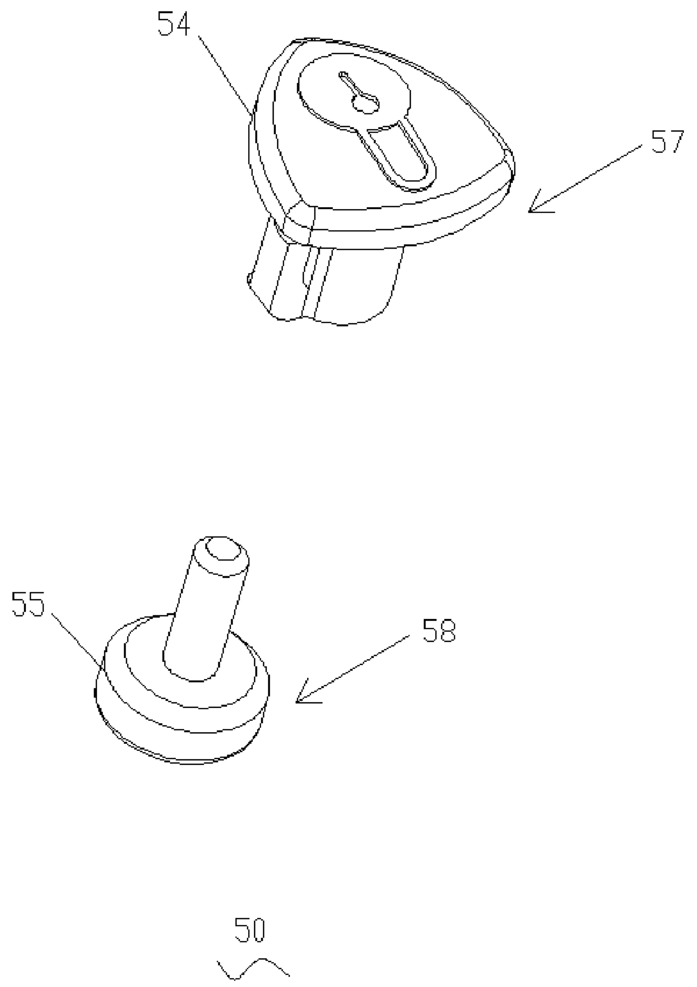
FIG. 10 is a stereogram when the lock button of the protection lock structure for the push-button cutter is disassembled according to the application.
Figure 11:
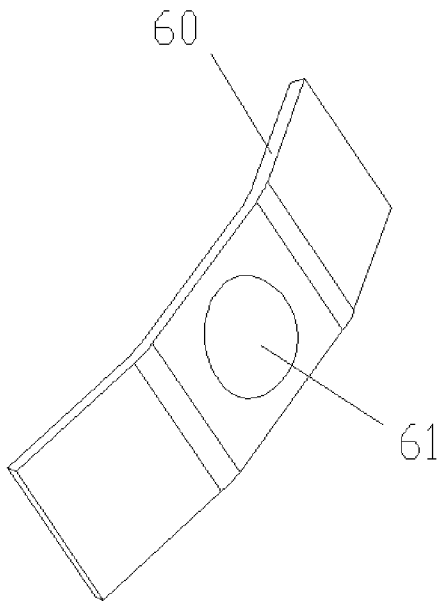
FIG. 11 is a stereogram of the positioning piece of the protection lock structure for the push-button cutter according to the application.

As shown in FIG. 10, the lock button 50 includes an upper button portion 57 and a lower button portion 58, and the upper button portion 57 is detachably connected with the lower button portion 58.

Figure 9:
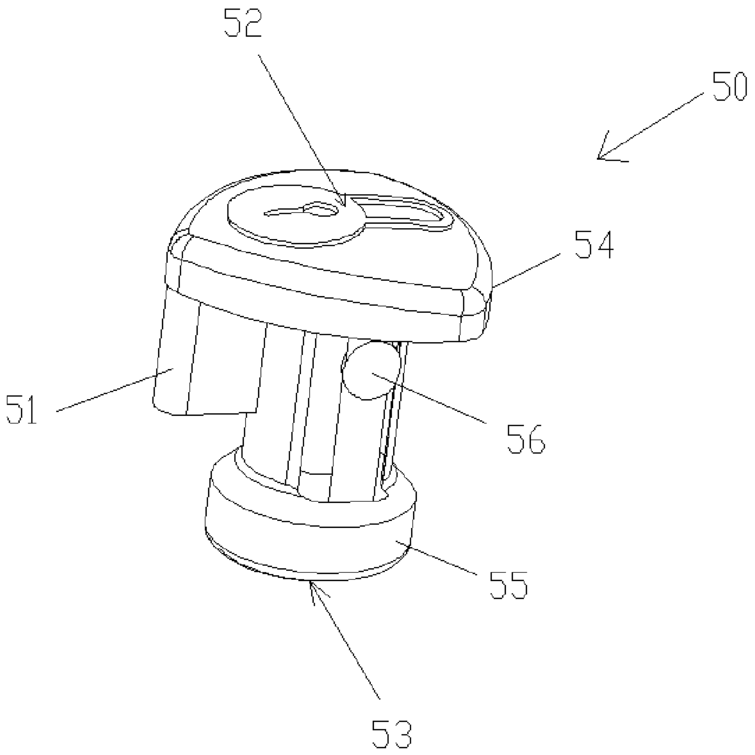
FIG. 9 is a stereogram when the lock button of the protection lock structure for the push-button cutter is assembled according to the application.

As shown in FIG. 9, an upper end of the upper button portion 57 is provided with an upper enlargement portion 54, a lower end of the lower button portion 58 is provided with a lower enlargement portion 55, the upper surface, corresponding to the upper enlargement portion 54, on the housing 10 is provided with an upper expansion hole 111 adapted to the upper enlargement portion 54, the lower surface, corresponding to the lower enlargement portion 55, on the housing 10 is provided with a lower expansion hole 121 adapted to the lower enlargement portion 55, and the upper expansion hole 111 and the lower expansion hole 121 have a set depth. The housing 10 between the upper expansion hole 111 and the lower expansion hole 121 is provided with a mounting hole adapted to a middle section of the lock button 50, and the mounting hole communicates the upper expansion hole 111 with the lower expansion hole 121. By arranging the upper expansion hole 111 and the lower expansion hole 121 to adapt to the corresponding upper enlargement portion 54 and lower enlargement portion 55 respectively, when the upper end or lower end of the lock button 50 is pressed for locking or unlocking during operation, the upper enlargement portion 54 and the lower enlargement portion 55 may only be pressed to the bottom of the corresponding expansion hole, thereby an operator is prompted that it is pressed already in place. In addition, the lower button portion 58 of the lock button 50 may be made of a plastic material with certain plastic deformation, and appropriate interference fit arrangement may be adopted between the lower enlargement portion 55 and the lower expansion hole 121, thereby a friction force between the lower enlargement portion 55 and the lower expansion hole 121 may be used, to improve a grip force of the lock button 50 to maintain stably in the existing position (especially in the second relative position).

An embodiment of the application further discloses a push-button cutter, including a protection lock structure as described in any one of the embodiments.

In conclusion, based on the protection lock structure for the push-button cutter and the push-button cutter of the application, its lock button 50 is provided with the locking portion 51, the adapter piece 30 is provided with the limiting portion 31, the lock button 50 forms the first relative position and the second relative position with the housing 10, and in the first relative position, the locking portion 51 is abutted against the limiting portion 31, this is a locking state, and the push button 40 may not be pushed to push the blade 20 out of the housing; and in the second relative position, the locking portion 51 is separated from the limiting portion 31, this is an unlocking state, the push button 40 may be pushed to push the blade 20 out of the housing. The blade 20 may only be pushed out of the housing in the unlocking state, and the risk of the blade 20 being pushed out of the housing under a non-human active external force may be avoided. The protection lock structure has the advantages of simple structure, reliable function, and convenient operation.

As long as it does not violate the ideas of the application, the different embodiments of the application may be combined arbitrarily, and it should be considered as the disclosed content of the application; and within the scope of the technical concept of the application, any combinations of a plurality of simple variations and different embodiments of the technical schemes that do not violate the ideas of the application shall be within the scope of protection of the application.

What is claimed is:

1. A push-button cutter, comprising a housing, a push button, a blade, an adapter piece, and a protection lock structure, the blade being arranged inside the housing, the adapter piece being connected to one side of the blade and being located inside the housing, one side of the push button being connected to the adapter piece, and the push button being at least partially exposed outside the housing, wherein the protection lock structure comprises a lock button and a limiting portion arranged on the adapter piece, the lock button is provided with a locking portion, the lock button is mounted on the housing, the lock button at least forms a first relative position and a second relative position with the housing, in the first relative position, the locking portion is abutted against the limiting portion, and in the second relative position, the locking portion is separated from the limiting portion; and a first operating end of the lock button penetrates an upper surface of the housing, a second operating end of the lock button penetrates a lower surface of the housing such that when the first operating end is pressed, the lock button is capable of being moved to the first relative position, and when the second operating end is pressed, the lock button is capable of being moved to the second relative position.

2. The push-button cutter according to claim 1, wherein the locking portion is arranged in a middle position, located between the first operating end and the second operating end, of the lock button, and the locking portion is arranged to be protruded to one side of the adapter piece.

3. The push-button cutter according to claim 2, wherein the limiting portion is arranged at one end, near the lock button, of the adapter piece, and the limiting portion is bent and protruded upwards on an upper surface of the adapter piece.

4. The push-button cutter according to claim 1, wherein the protection lock structure further comprises a positioning apparatus, and the positioning apparatus maintains the lock button in the first relative position and the second relative position.

5. The push-button cutter according to claim 4, wherein the positioning apparatus comprises a positioning piece and a mutually adapted positioning structures arranged respectively on the positioning piece and the lock button; and the positioning structure comprises a positioning groove arranged on one side, towards the positioning piece, of the lock button, and a positioning protrusion arranged on one side, towards the lock button, of the positioning piece.

6. The push-button cutter according to claim 5, wherein the positioning groove is arranged as an arc-shaped groove, and the positioning protrusion is arranged as an arc-shaped protrusion corresponding to the arc-shaped groove.

7. The push-button cutter according to claim 5, wherein the housing comprises an upper housing and a lower housing, opposite sides of the upper housing and the lower housing are closed mutually to form the housing, the opposite side of the upper housing or the lower housing is provided with a mounting groove, and the positioning piece is adaptively embedded in the mounting groove.

8. The push-button cutter according to claim 1, wherein the lock button comprises an upper button portion and a lower button portion, and the upper button portion is detachably connected with the lower button portion.

9. The push-button cutter according to claim 8, wherein an upper end of the upper button portion is provided with an upper enlargement portion, a lower end of the lower button portion is provided with a lower enlargement portion, the upper surface, corresponding to the upper enlargement portion, on the housing is provided with an upper expansion hole adapted to the upper enlargement portion, the lower surface, corresponding to the lower enlargement portion, on the housing is provided with a lower expansion hole adapted to the lower enlargement portion, and the upper expansion hole and the lower expansion hole have a set depth; and the housing between the upper expansion hole and the lower expansion hole is provided with a mounting hole adapted to a middle section of the lock button, and the mounting hole communicates the upper expansion hole with the lower expansion hole.

* * * * *